(12) United States Patent
Israely

(10) Patent No.: US 6,708,445 B1
(45) Date of Patent: Mar. 23, 2004

(54) INSECT KILLER

(76) Inventor: Nimrod Israely, House No. 53, Mesilat Tzion (IL), 99770

( * ) Notice: Subject to any disclaimer, the term of this patent is extended or adjusted under 35 U.S.C. 154(b) by 0 days.

(21) Appl. No.: 09/959,539

(22) PCT Filed: Apr. 18, 2000

(86) PCT No.: PCT/IL00/00227

§ 371 (c)(1),
(2), (4) Date: Mar. 4, 2002

(87) PCT Pub. No.: WO00/64252

PCT Pub. Date: Nov. 2, 2000

(30) Foreign Application Priority Data

Apr. 27, 1999 (IL) .................................................. 129634

(51) Int. Cl.⁷ ............................. A01M 1/20; A01M 1/02
(52) U.S. Cl. ....................................... 43/132.1; 43/131
(58) Field of Search .............................. 43/131, 132.1, 43/107, 118, 119, 122

(56) References Cited

U.S. PATENT DOCUMENTS

| | | | | |
|---|---|---|---|---|
| 94,569 A | * | 9/1869 | Craig ........................... | 43/119 |
| 111,497 A | * | 1/1871 | Walker ........................ | 43/119 |
| 418,803 A | | 1/1890 | Medford | |
| 745,364 A | * | 12/1903 | Martin ........................ | 43/131 |
| 975,470 A | * | 11/1910 | Shrady ..................... | 43/132.1 |
| 1,759,359 A | * | 5/1930 | Lennox ........................ | 43/131 |
| 2,004,121 A | * | 6/1935 | Loibl, Jr. ...................... | 43/131 |
| 2,856,725 A | * | 10/1958 | Kenline ...................... | 43/132.1 |
| 3,118,427 A | * | 1/1964 | Stanzel ........................ | 43/131 |
| 3,826,036 A | * | 7/1974 | Neugebauer ................ | 43/132.1 |
| 4,899,485 A | * | 2/1990 | Schneidmiller .............. | 43/107 |
| 4,959,924 A | | 10/1990 | Martin | |
| 5,031,354 A | | 7/1991 | Olson | |
| 5,150,541 A | * | 9/1992 | Foster et al. ................... | 43/131 |
| 5,301,458 A | | 4/1994 | Deyoreo et al. | |
| 5,339,007 A | | 8/1994 | Walton | |
| 5,359,808 A | * | 11/1994 | Fitsakis ..................... | 43/132.1 |
| 5,392,558 A | * | 2/1995 | Blomquist ................... | 43/107 |
| 5,608,988 A | | 3/1997 | Dowling et al. | |
| 5,815,981 A | | 10/1998 | Hummelle et al. | |
| 5,839,221 A | * | 11/1998 | Ron et al. ................... | 43/132.1 |
| 5,907,923 A | * | 6/1999 | Heath et al. ................... | 43/107 |
| 5,943,815 A | | 8/1999 | Paganessi et al. | |
| 6,543,180 B2 | * | 4/2003 | Pace ........................... | 43/107 |

FOREIGN PATENT DOCUMENTS

| | | | | |
|---|---|---|---|---|
| AU | 35134 A1 | * | 11/1990 | ................. 43/107 |
| EP | 0 446 464 A1 | | 9/1991 | |
| FR | 2074729 B1 | * | 10/1971 | |
| FR | 2487167 B1 | * | 1/1982 | ................. 43/132.1 |
| JP | 2001-91 B1 | * | 1/2001 | |
| WO | WO-80/01866 B1 | * | 9/1980 | |
| WO | WO 94/09624 A1 | | 5/1994 | |

* cited by examiner

*Primary Examiner*—Darren W. Ark
(74) *Attorney, Agent, or Firm*—Browdy and Neimark, P.L.L.C.

(57) ABSTRACT

A device for killing flying insects is provided. The device includes a planar textile area arranged for suspension in a vertical plane, provided on one face with a pocket extending over a portion of the area, a closed edge of the pocket being disposed proximate to the center of the area, the pocket having at least one aperture to allow the insertion therethrough of a viscous liquid poisonous to flying insects and having an odor attractive to the insects. The liquid spreads over the major portion of the area by gravity and capillary action. Insects are attracted to the device dying consequent to ingestion of the liquid.

7 Claims, 2 Drawing Sheets

INSECT KILLER

REFERENCE TO RELATED APPLICATIONS

The present application is the national stage under 35 U.S.C. 371 of international application PCT/IL00/00227, filed Apr. 18, 2000 which designated the United States, and which international application was published under PCT Article 21(2) in the English language.

FIELD OF THE INVENTION

The present invention relates to the elimination of insects. More particularly, the invention provides a device to attract and poison flies and other flying insects.

BACKGROUND OF THE INVENTION

Flying insects are annoying to both people and animals, more so flying insects are known to be harmful to all kinds of vegetation and agriculture in general. The direct and indirect damage to plantation and citrus orchards is well known and need no further elaboration. Insects are known to spread diseases by contacting contaminated matter and then settling on food for human consumption. For both reasons many devices for insect control have been developed, dating back to Medford's U.S. Pat. No. 418,803 issued in 1890.

Insect control devices, aside from spays, can be roughly categorized into four groups:
  a. Repellent devices which emit odors, sound or some form of electromagnetic radiation offensive to insects.
  b. Traps and adhesive devices which entice insects to enter an enclosure or contact a sticky surface from which they do not escape.
  c. Active devices, which kill insects by high voltage electricity or mechanical impact.
  d. Poisoning devices.

Each group has its advantages and disadvantages. In Israel the most commonly used device in agriculture at present is a type "b" device which uses pheromones in order to attract the various insects.

The present state of the art may be learned from the following recent U.S. Patents:

In U.S. Pat. No. 5,031,354, Olson discloses a type "b" insect trapping device for mounting on a horizontal surface coated with an insect attracting adhesive. Due to its horizontal orientation the device is liable to become dirt coated after a short period of exposure and become ineffective.

A type "c" device is disclosed by Deyoreo et al in U.S. Pat. No. 5,301,458. The novelty of the device lies in the addition of a fan-driven air flow to draw insects into contact with an electrically charged grid. Obviously, the cost of the device is even higher than devices relying on light alone to attract insects.

A further type "c" device is disclosed by Walton in U.S. Pat. No. 5,339,007 who describes a device having discharge lamp, a ballast inductor, a pulse transformer, a triac and a capacitor in a device having a lower electricity consumption. It is to be doubted whether the power savings justify the high first cost of the device.

Dowling et al disclose "b" type devices in U.S. Pat. Nos. 5,608,988 and 5,815,981. The former specification is intended for use adjacent the glass pane of a window. There is no attraction means for insects that are intended to be trapped on an adhesive layer.

SUMMARY OF THE INVENTION

It is one of the objects of the present invention to provide a device operating without electric power and which is resistant to becoming dirt coated, mainly but not exclusively for agricultural use.

It is a further object of the present invention to provide a device that can be manufactured at a cost lower than prior art devices.

The present invention achieves the above objects by providing a device for killing flying insects, The device includes a planar textile area arranged for suspension in a vertical plane, provided on one face with a pocket extending over a portion of the area, a closed edge of the pocket being disposed proximate to the center of the area, the pocket having at least one aperture to allow the insertion therethrough of a viscous liquid poisonous to flying insects and having an odor attractive to the insects. The liquid spreads over the major portion of the area by gravity and capillary action. Insects are attracted to the device dying consequent to ingestion of the liquid.

In a preferred embodiment of the present invention there is provided a device wherein the cloth and the pocket are of a yellow color.

In a most preferred embodiment of the present invention there is provided a device wherein a red-colored sector is disposed proximate to the center of the area on at least one face thereof.

Yet further embodiments of the invention will be described hereinafter.

It will thus be realized that the novel device of the present invention serves to effectively attract insects due to attracting same by a combination of visual and olfactory means. As the device is intended for use in the vertical plane, dirt accumulation on its active surfaces is much less of a problem than equivalent horizontal devices. The device is silent, and can be used anywhere, as no electric power is needed.

BRIEF DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

The present invention will be understood and appreciated more fully from the following detailed description taken in conjunction with the appended drawings in which.

DETAILED DESCRIPTION OF THE PRESENT INVENTION

Figure 1:
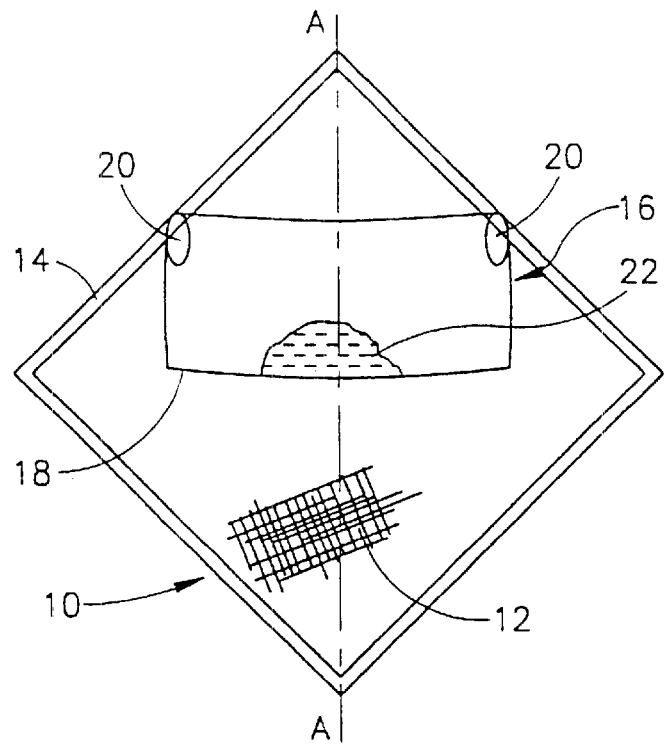
FIG. 1 is an elevational fragmented view of a preferred embodiment of the device according to the invention.

There is seen in FIG. 1 a device 10 for killing flying insects, typically fruit flies. A planar textile area 12, shown in the form of a square disposed with a vertical diagonal AA, is arranged for suspension in a vertical plane. A square size used and found suitable in tests was 36 cm×36 cm.

Advantageously, the textile area 12 comprises a cloth made of a synthetic fiber. A cloth used successfully is marketed under the name "PALRIG" and is manufactured in Israel.

Advantageously, the textile area 12 is suspended in a rigid frame 14.

Disposed on one face of the textile area 12 is a pocket 16 extending over a portion of the area. The closed lower edge 18 of the pocket 16 is located proximate to the center of area 12, or a little higher.

The pocket 16 has two apertures 20 to allow the insertion therethrough of a viscous liquid 22 poisonous to flying insects and having an odor attractive to said insects. After insertion in the pocket 16 the liquid 22 spreads over the major portion of area 12 gravity and by capillary action.

Preferably, both the textile area 12 and the pocket 16 are of a yellow color, which is known to attract fruit-flies.

Insects attracted to the device 10 die consequent to ingestion of poisonous liquid 22.

After use, the apertures 20 are used to clean the device 10.

With reference to the rest of the figures, similar reference numerals have been used to identify similar parts.

Figure 2:
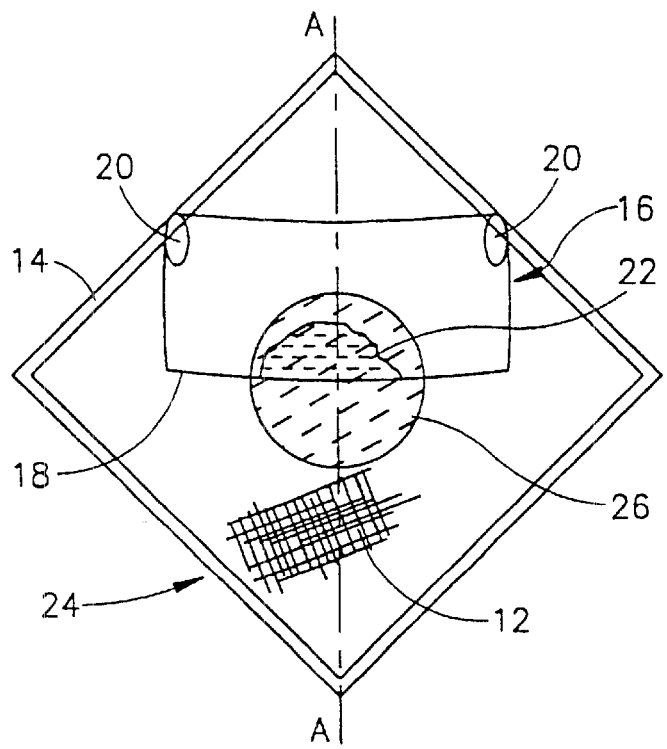
FIG. 2 is a an elevational fragmented view of an embodiment provided with an enhanced visual bait.

Referring now to FIG. 2, there is seen a similar device 24 having a further feature known to attract certain flying insects.

A red-colored sector 26, typically 9–11 cm diameter, is disposed proximate to the center of area 12 on both major faces. It is believed that the red color is associated by the fruit flies with fruits, causing the insect to home in on sector 26.

Figure 3:
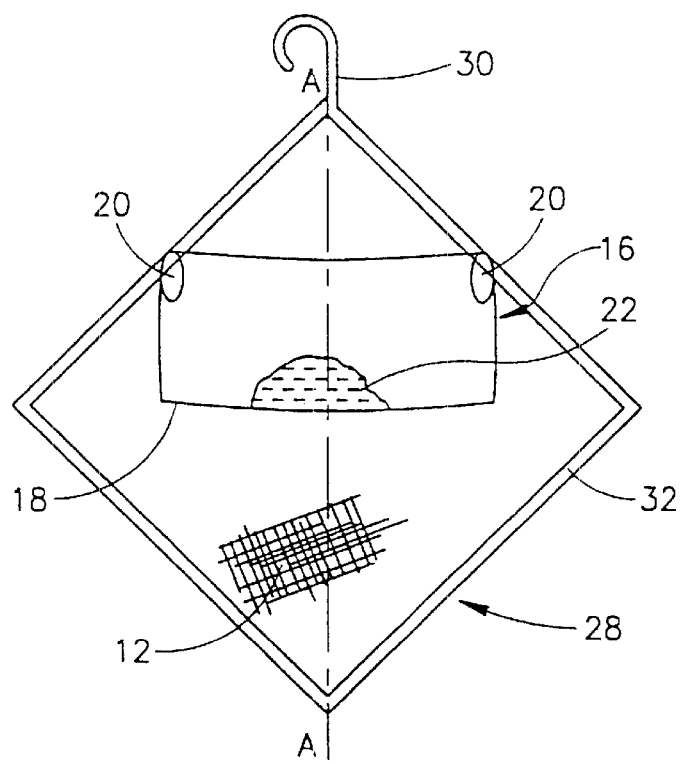
FIG. 3 is a an elevational fragmented view of an embodiment with suspension means.

FIG. 3 illustrates a device 28 that, for purposes of safety, further comprises suspension means 30 to hold the device at a height out of reach of children and small animals.

In the shown embodiment, suspension means 30 comprise a wire hook, which is formed in one piece with a wire frame 32 used for retaining the textile area 12 in the deployed formation shown.

Figure 4:
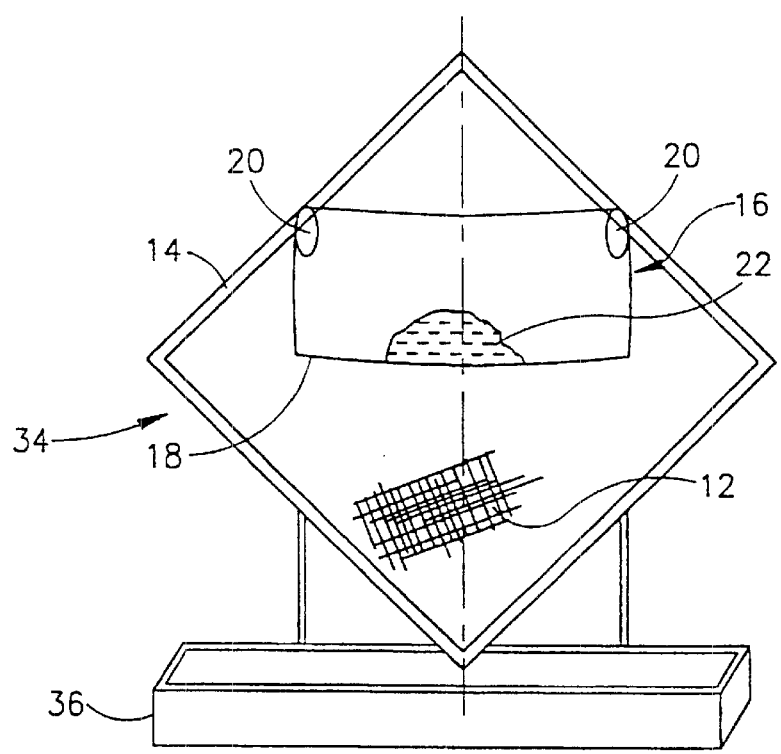
FIG. 4 is a fragmented perspective view of an embodiment for indoor use.

Seen in FIG. 4 is a device 34, intended for indoor use, similar to that shown in FIG. 1.

A collection tray 36 is disposed under and supported by the area for receiving therein poisoned insects.

The scope of the described invention is intended to include all embodiments coming within the meaning of the following claims. The foregoing examples illustrate useful forms of the invention, but are not to be considered as limiting its scope, as those skilled in the art will readily be aware that additional variants and modifications of the invention can be formulated without departing from the meaning of the following claims.

What is claimed is:

1. A device for killing flying insects, comprising:

a generally planar textile having a front surface and a rear surface, and adapted to absorb a viscous liquid;

a hanger element attached to said planar textile for suspending said device in a location whereby at least said front surface of said planar textile is exposed;

a pocket extending over an upper portion of said front surface of said planar textile, a closed edge of said pocket being disposed proximate to a center of said planar textile, said pocket being adapted to leak a viscous liquid therefrom to said planar textile;

said pocket having at least one aperture at an upper part thereof to allow insertion therethrough of a viscous liquid poisonous to flying insects and having an odor attractive to said insects; and said pocket having therewithin a quantity of said viscous liquid poisonous to flying insects by ingestion and having an odor attractive to said insects.

2. The device of claim 1 further comprising a rigid frame supporting said planar textile.

3. The device of claim 2, wherein said textile comprises synthetic fibers.

4. The device of claim 3, wherein said planar textile and said pocket are of a yellow color.

5. The device of claim 4, further comprising a red-colored sector disposed proximate to the center of said planar textile on said front surface.

6. The device of claim 2 wherein said hanger element comprises a hook.

7. The device of claim 1 wherein said pocket is the only pocket.

\* \* \* \* \*